(12) United States Patent
Berkner et al.

(10) Patent No.: US 8,184,918 B2
(45) Date of Patent: May 22, 2012

(54) HEADER-BASED PROCESSING OF IMAGES COMPRESSED USING MULTI-SCALE TRANSFORMS

(75) Inventors: Kathrin Berkner, Menlo Park, CA (US); Ramesh Neelamani, Houston, TX (US); Edward L. Schwartz, Sunnyvale, CA (US); Martin Boliek, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 228 days.

(21) Appl. No.: 11/787,835

(22) Filed: Apr. 17, 2007

(65) Prior Publication Data
US 2009/0103818 A1    Apr. 23, 2009

Related U.S. Application Data

(63) Continuation of application No. 10/044,420, filed on Jan. 10, 2002, now Pat. No. 7,428,338.

(51) Int. Cl.
G06K 9/20    (2006.01)
G06K 9/36    (2006.01)
G06K 9/46    (2006.01)

(52) U.S. Cl. .................. 382/235; 382/282

(58) Field of Classification Search .......... 382/166, 382/173, 232, 235, 248; 348/403.1; 375/240.18, 375/240.19; 708/203
See application file for complete search history.

(56) References Cited

U.S. PATENT DOCUMENTS

| | | | | |
|---|---|---|---|---|
| 5,563,960 A * | 10/1996 | Shapiro | | 382/239 |
| 6,775,325 B1 * | 8/2004 | Florencio | | 375/240.03 |
| 6,795,577 B2 * | 9/2004 | Amonou | | 382/173 |
| 6,813,384 B1 * | 11/2004 | Acharya et al. | | 382/232 |
| 2002/0154227 A1 * | 10/2002 | Lan et al. | | 348/240.2 |
| 2003/0099404 A1 * | 5/2003 | Koide | | 382/240 |

FOREIGN PATENT DOCUMENTS

| | | |
|---|---|---|
| EP | 0 731 422 A2 | 2/1996 |
| EP | 0 833 519 A2 | 4/1998 |
| EP | 1 162 573 | 12/2001 |
| WO | WO 00/01153 | 1/2000 |
| WO | WO 0001153 A1 | 1/2000 |
| WO | WO 00/10131 | 2/2000 |

OTHER PUBLICATIONS

Neelamani et al. ("Multiscale image segmentation using joint texture and shape analysis," SPIE vol. 4119, 2000, pp. 215-227).*

(Continued)

*Primary Examiner* — Yubin Hung
(74) *Attorney, Agent, or Firm* — Blakely, Sokoloff, Taylor & Zafman LLP

(57) ABSTRACT

A method and apparatus is described for segmenting an image, for adaptively scaling an image, and for automatically scaling and cropping an image based on codestream headers data. In one embodiment, a file that can provide a header that contains multi-scale entropy distribution information on blocks of an image is received. For each block, the block is assigned to a scale from a set of scales that maximizes a cost function. The cost function is a product of a total likelihood and a prior. The total likelihood is a product of likelihoods of the blocks. The image is segmented by grouping together blocks that have been assigned equivalent scales. In one embodiment, the file represents an image in JPEG 2000 format.

22 Claims, 13 Drawing Sheets
(3 of 13 Drawing Sheet(s) Filed in Color)

OTHER PUBLICATIONS

A. Skodras et al., "The JPEG 2000 Still Image Compression Standard", IEEE Signal Processing Magazine IEEE USA, vol. 18, No. 5, Sep. 2001, pp. 36-58, XP002439380, ISSN. 1053-5888.

M.W. Marcellin et al., "An Overview of JPEG-2000", Proceedings DCC 2000, Data Compression Conference, Mar. 28, 2000, pp. 523-541, IEEE, Los Alamitos, CA, U.S.A., XP002439379, ISSN. 0-7695-0592-9.

European Search Report, search completed Jun. 26, 2007 in the European Patent Office for related Application EP 07 10 6420, pp. 10.

Examination Report for European Application EP 03 000 510.2-1522. 7 pages.

Syed, Yasser F., et al. "A wavelet block chain technique for use in zerotree coding". Electrical Engineering Dept., Univ. of Texas at Arlington. 5 pages.

Strobel, N., et al: "MMAP: Modified Maximum a Posteriori Algorithm for Image Segmentation in Large Image/Video Databases", Image Processing, 1997. Proceedings, International Conference on Santa Bara, CA, USA Oct. 26-29, 1997, IEEE, pp. 196-199.

Rehrauer, H., et al.: "Multiscale Image Segmentation with a Dynamic Label Tree", Geoscience and Remote Sensing Symposium Proceedings, 1998. IGARSS '98. 1998 IEEE International, Seattle, WA, USA Jul. 6-10, 1998, New York NY, USA, IEEE.

Queiroz De R.L., et al.: "Fast Segmentation of the JPEG Compressed Documents", Journal of Electronic Imaging, SPIE & IS&T, US, vol. 7, No. 2, Apr. 1, 1998, pp. 367-377.

Marcellin, M.W., et al.: "An overview of JPEG-2000", Data Compression Conference 2000 Proceedings. DCC 2000 Snowbird, UT, US, Mar. 28-30, 2000, pp. 523-541.

Queiroz et al. ("Fast Segmentation of the JPEG Compressed Documents," Journal of Electronic Imaging, vol. 7(2), Apr. 1998, pp. 367-377).

International Standard ISO/IEC 15444-1 (First edition, Dec. 15, 2000) on JPEG 2000 core coding system, pp. 213-216), (2).

* cited by examiner

HEADER-BASED PROCESSING OF IMAGES COMPRESSED USING MULTI-SCALE TRANSFORMS

This is a continuation of application Ser. No. 10/044,420, filed on Jan. 10, 2002 now U.S. Pat. No. 7,428,338, entitled "Header-Based Processing of Images Compressed Using Multi-Scale Transforms," assigned to the corporate assignee of the present invention and incorporated herein by reference.

RELATED APPLICATIONS

This application is related to the co-pending application entitled "Content And Display Device Dependent Creation Of Smaller Representations Of Images," filed on Jan. 10, 2002, U.S. patent application Ser. No. 10/044,603, assigned to the corporate assignee of the present invention.

FIELD OF THE INVENTION

The invention relates generally to the field of image processing. More specifically, the invention relates to processing images using multi-scale transforms.

BACKGROUND OF THE INVENTION

Digital images can be represented and stored in a variety of formats. A common feature in digital image representation formats is that the bits constituting an image file are divided into image description bits and header bits. Image description bits describe the actual underlying image. Often the image description bits are divided into smaller units for convenience. Header bits provide organizational information about the image, such as image size in pixels, file size, length in bits for the various smaller image description units, etc.

Compressed image files contain a wide variety of organizational information in the header primarily to facilitate convenient file management and interpretation. For example, in addition to conventional information such as width, height, color component information and other details, JPEG 2000 ITU-T Rec. T.800|(ISO/IEC 15444-1:2000) image headers also provide information about the number of bits contained in smaller units, such as groups of wavelet coefficients (termed code-blocks), that constitute compressed data for image and the wavelet-domain locations of these small units of coefficients. Other image file formats can contain similar information.

In R. De Queiroz and R. Eschbach, "Fast segmentation of the JPEG compressed documents," *Electronic Imaging*, vol. 7, pp. 367-377, April 1998, segmentation of conventional JPEG compressed documents using the entropy of 8×8 blocks in the image is described. The technique described therein does not use header-based processing, as the entropy values are not available in the conventional JPEG image header. Also, the technique employs a discrete cosine transform ("DCT") used by conventional JPEG that operates only on local 8×8 blocks. Hence, the technique does not use multi-scale transforms. Furthermore, the technique only uses the available entropy distributions on 8×8 blocks in the image domain and does not have access to any multi-scale bit distribution.

Image analysis involves describing, interpreting, and understanding an image. Image analysis extracts measurements, data or information from an image. Image analysis techniques involve feature extraction, segmentation and classification. Image analysis may be referred to as computer vision, image data extraction, scene analysis, image description, automatic photointerpretation, region selection or image understanding. See W. Pratt, *Digital Image Processing*, (2$^{nd}$ Edition), John Wiley & Sons, Inc., New York, N.Y., 1995, and A. Jain, *Fundamentals of Digital Image Processing*, Prentice Hall, Englewood Cliffs, N.J., 1995.

Image processing produces a modified output image from an input image. Image processing techniques include cropping, scaling, point operations, filtering, noise removal, restoration, enhancement. (Jain chapters 7 and 8; Pratt Part 4.)

In some applications, it is desirable for first perform image analysis on an image and then to use the analysis to control image processing on the image. For example, the program "pnmcrop" (http://www.acme.com/software/pbmplus/) first analyzes an image to find stripes of a background color (a single color value, for example white or black) on all four sides. Then it performs an image processing operation, cropping, on the image to remove the stripes.

SUMMARY OF THE INVENTION

A method and apparatus is disclosed herein for performing operations such as image segmentation, adaptive scale selection, and automatic region selection and scaling on the underlying image using only the image file header information. The image files use a multi-scale image compression technique. A multi-scale bit allocation, which is used for processing, is estimated from the file header. The processing algorithms use the number of bits allocated by the image coder (or, in another embodiment, estimated to be allocated) as a quantitative measure for the visual importance of the underlying features.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
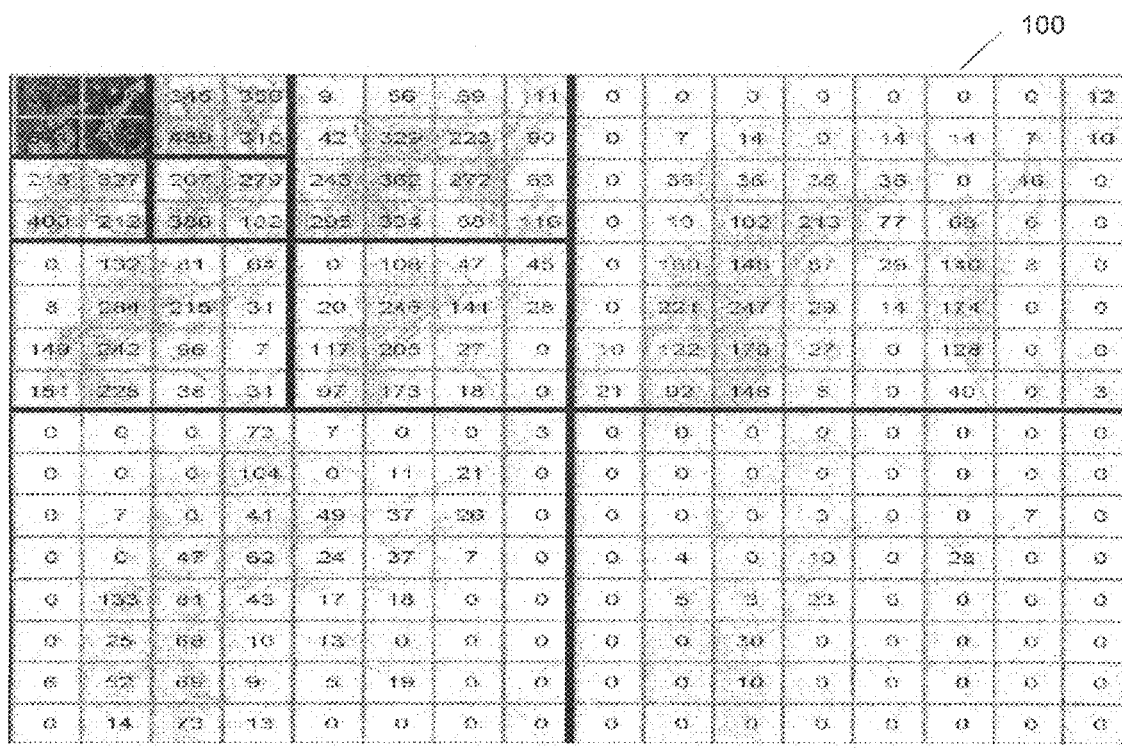
FIG. 1 illustrates a multi-scale entropy distribution for an image.

A method and apparatus for using file header information to process an underlying digital image is described. The file header information may be part of a bit stream that includes compressed data corresponding to the underlying digital image. The processing described herein uses the information in the header and process it in a specific way to determine what portions of the compressed data to decode. In essence, the information in the header enables identification of a region or regions upon which further processing is to occur.

In one embodiment, the compressed data comprises an image representation format resulting from multi-scale transform-based compression. Compressed data consists of header and image description bits. That is, multi-scale transformed based compression is applied to image data as part of the process of generating the image description bits. From the header, the image coder's entropy distribution, or bit allocation, in the multi-scale domain may be estimated and used as a quantitative measure for visual importance of the underlying image features. For example, from the header of a JPEG 2000 file information such as, the length of codeblocks, the number of zero bit planes, the number of coding passes, may be used to determine the entropy distribution. In this manner, the bit distribution in a multi-scale transform based representation is used to perform one or more operations, including, but are not limited to, image segmentation, adaptive scale/resolution selection for images, and automatic scaling and detection and selection, scaling and cropping of important image regions.

In one embodiment, information in the header is used to generate an entropy distribution map that indicates which portions of the compressed image data contain desirable data for subsequent processing. An example of such a map is given in FIG. 1. Other maps are possible and may indicate the number of layers, which are described below with the description of JPEG 2000, to obtain a desired bit rate (particularly for cases when layer assignment is related to distortion) or the entropy distribution for each of a number of bit rates. In the latter case, each rectangular area on the map has a vector associated with it. The vector might indicate values for multiple layers.

Image representation formats that utilize multi-scale transforms to compress the image description bits typically incorporate many organizational details in the header, so that pixel-wise description about the digital image can be decoded correctly and conveniently. JPEG 2000 is an example of an image compression standard that provides multi-scale bit distributions in the file header. Often the image description bits are divided among smaller units, and the number of bits allocated by the encoder to these units is stored in the image header to facilitate features such as partial image access, adaptation to networked environments, etc. Using information theoretic conventions, the allocated number of bits is referred to as the entropy of each small unit. Entropy distributions used by image coders provide an excellent quantitative measure for visual importance in the compressed images. For lossless compression, an image coder uses more bits to describe the high activity (lot of detail) regions, and less bits to convey the regions with little detail information. For lossy compression, the image coder typically strives to convey the best possible description of the image within the allocated bits. Hence, the coder is designed to judiciously spends the available few bits describing visually important features in the image.

A multi-scale image coder does not code image pixels, but coefficients of the transformed image where the transform performs a separation of image information into various frequency bands. Multi-scale image coders (e.g., a JPEG 2000 coder) provide the multi-scale distribution of entropy for the underlying image in the image header. Since such transform basis functions exhibit simultaneous spatial and frequency localization, the transform coefficients contain information about the frequency content at a specified location in the image.

The ability to process an image simply based on its header is desirable, because not only is the header information easily accessed using a small number of computations, but also the condensed nature of the available image information enables more efficient subsequent processing. Importantly, the header information, which is easy to access, indicates information about the image without decoding coefficients. Therefore, processing decisions can be made without having to expend a large amount of time decoding coefficients.

The techniques described herein have applications in areas such as, but not limited to, display-adaptive image representations, digital video surveillance, image database management, image classification, image retrieval, and preprocessing for pattern analysis, image filtering and sizing.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates one multi-scale entropy distribution for an image. The image undergoes JPEG 2000 encoding initially. The underlying patterns are the wavelet coefficients of the image. The thin lines denote the JPEG 2000 division of the wavelet domain coefficients into code blocks, and the thick lines separate the different wavelet sub-bands. In JPEG 2000, the coder performing the encoding process allocates and divides the wavelet domain coefficients into small units called code blocks. The numbers shown in each square are the bits or entropies allocated to the respective code blocks by the JPEG 2000 coder operating at 0.5 bits per pixel using three levels of decomposition. These numbers represent the multiscale entropy distribution.

The entropy allocations, which are accessed using only the JPEG 2000 file header, provide a good measure for the visual importance of the different features at various scales and help distinguish between the different types of important image features characterized by different multiscale properties. For example, to describe the feather region in the image, a multi-scale image coder spends many bits coding the fine scale coefficients and less on coarse scale coefficients than, e.g., fine scale coefficients corresponding to the feather region. On the other hand, to code the face region, a multi-scale image coder spends more bits coding the intermediate scale coefficients corresponding to the face region. The smooth background receives few bits. Thus, the multi-scale entropy distribution provides significant information about the underlying image features. Assuming knowledge of the multi-scale entropy distribution is obtained from headers, one or more operations may be performed. These operations may be, for example, image segmentation, automatic active region identification and scaling, and/or adaptive image scaling.

JPEG 2000 is a standard to represent digital images in a coherent code-stream and file format (See, e.g., ITU-T Rec. T.800|ISO/IEC 15444-1:2000, "JPEG 2000 image coding standard," in www.iso.ch). JPEG 2000 efficiently represents digital image by efficiently coding the wavelet coefficients of the image using the following steps. A typical image consists of one or more components (e.g., red, green, blue). Components are rectangular arrays of samples. These arrays are optionally divided further into rectangular tiles. On a tile-by-tile basis, the components are optionally decorrelated with a color space transformation. Each tile-component is compressed independently. Wavelet coefficients of each color component in the tile are obtained. The wavelet coefficients are separated into local groups in the wavelet domain. These are called code blocks. The code blocks are optionally ordered using precincts. Arithmetic coding is used to code these different wavelet-coefficient groups independently. The coded coefficients are optionally organized into layers to facilitate progression. Coded data from one layer of one resolution of one precinct of one component of one tile is stored in a unit called a packet. In addition to coded data, each packet has a packet header. After coding, a tile-component is optionally divided into tile-parts, otherwise the tile-component consists of a single tile-part. A tile-part is the minimum unit in the code-stream that corresponds to the syntax. A JPEG 2000 codestream consists of syntax (main and tile-part headers, plus EOC) and one or more bitstreams. A bitstream consists of packets (coded data for codeblocks, plus any instream markers including instream packet headers). The organizational information to parse the coded data, the packet headers, may be stored in the main header, tile headers, or in-stream.

JPEG 2000 has main headers and tile headers which contain marker segments. JPEG 2000 also has packet headers which may be contained in marker segments or be in-stream in the bit stream. Headers are read and used as inputs to processing which obtains a multiscale entropy distribution. Table 1 summarizes the information contained in various JPEG 2000 headers that is relevant to header-based processing.

TABLE 1

Uses of JPEG 2000 file header information

| Header Entries | Type of Information | Role to Entropy Estimation | Main | Tile | In-stream |
|---|---|---|---|---|---|
| Packet header (PPM, PPT, in-stream) | Length of coded data; number of zero bit planes and coding passes | Provides entropy of each code block of each sub-band of each component of tile. Facilitates estimation of entropy allocation at lower bit rates. Provides rough estimate of coefficient energies and magnitudes. | ✓ | ✓ | ✓ |

TABLE 1-continued

Uses of JPEG 2000 file header information

| Header Entries | Type of Information | Role to Entropy Estimation | Main | Tile | In-stream |
|---|---|---|---|---|---|
| Packet length (PLM, PLT) | Lengths of packets | Facilitates faster estimation of code block entropies for some JPEG 2000 files | ✓ | ✓ | |
| Tile-length part (TLM, SOT) | Lengths of tiles | Provides entropy of each tile. Facilitates local and global entropy comparison | ✓ | ✓ | |
| SIZ | Size of image | Helps determine location of code blocks | ✓ | | |
| COD, COC, QCC, QCD | Coding style | Number of transform levels, code block size, maximum size of coefficients, precinct information | ✓ | ✓ | |
| RGN | Region information | Estimate size and importance of region of interest. Alters meaning of most of the above information | ✓ | ✓ | |

In the case of the packet header (PPM, PPT, in-stream), it may be in either the main header, tile header or in-stream, but not a combination of any two or more of these at the same time. On the other hand, the packet length and tile-length part may be in the main header or the tile headers, or in both at the same time.

Estimation of Low Bit Rate Entropy Distribution from High Bit Rate Entropy Distribution The multi-scale entropy distribution at lower bit rates provides a robust measure for visual importance. At higher bit rates the existence of image noise, which is present in digital images from any sensor or capture device, corrupts the overall entropy distribution. Depending on the application, images are encoded losslessly or lossy. The layering scheme in the JPEG 2000 standard could be used to order the codestream of a lossless or high bit rate encoded image into layers of visual or Mean-Squared-Error (MSE)-based importance. In this case, a low bit rate version of the image could be obtained by extraction of information from only the packets in some layers and ignoring the packets in the other layers. If such layering is not employed by the encoder, the packet length information from the header can yield the multi-scale entropy distribution only at the bit rate chosen by the encoder, e.g. lossless, high bit rate or low bit rate.

If the encoder choice was lossless or high bit rate, an estimation of a low bit rate version of the image is obtained before applying any of the image processing algorithms explained later. One embodiment for performing such an estimation is described below. To determine the order in which bits are allocated, information of the maximum of absolute values of coefficients and the number of coding passes in a codeblock from headers as well as heuristic and statistical information on visual or (MSE)-based importance of subbands at various resolution levels is used.

The estimation successively subtracts bits from the total number of bits per codeblock until a given bit rate for the image is reached. The order of subtraction is the reverse of a bit allocation algorithm. The allocation algorithm may be the same as the one used by the encoder, but it is not required to be.

From the packet header of a JPEG 2000 file the length of a codeblock, i.e. the number of bits "B", number of zero bitplanes "NZ" and the number of coding passes "CP" used during encoding are available. From the number of zero bitplanes, an estimation of the maximum value of absolute values of coefficients in the codeblock, $2^{maxB}$, can be obtained by computing the maximum non-zero bitplane $$\text{Max}B = MSB(\text{codeblock subband}) - NZ, \quad (1)$$

where MSB is the maximum number of bitplanes of the specific subband of which the codeblock belongs. MSB is defined by information in the appropriate QCC or QCD header entry for JPEG 2000. Based on visual or MSE-based weighting or statistical properties of images, an order of subbands and bitplanes can be derived that reflects the importance of a bit plane in a given subband. Based on, e.g., MSE importance, the ordering of importance of bit planes in a subband of a 5-level decomposition is given by the one displayed in Table 2.

TABLE 2

Order of importance of bitplanes and subbands based on MSE weighting.

| order in i (least important, i = 1; to most important) | bitplane b(i) | subband s(i) | level l(i) |
|---|---|---|---|
| 1 | 1st bitplane | HH | level 1 |
| 2 | 1st bitplane | LH/HL | level 1 |
| 3 | 1st bitplane | HH | level 2 |
| 4 | 2nd bitplane | HH | level 1 |
| 5 | 1st bitplane | LH/HL | level 2 |
| 6 | 1st bitplane | HH | level 3 |
| 7 | 2nd bitplane | LH/HL | level 1 |
| 8 | 2nd bitplane | HH | level 2 |
| 9 | 1st bitplane | LH/HL | level 3 |
| 10 | 1st bitplane | HH | level 4 |
| 11 | 3rd bitplane | HH | level 1 |
| 12 | 2nd bitplane | LH/HL | level 2 |
| 13 | 2nd bitplane | HH | level 3 |
| 14 | 1st bitplane | LH/HL | level 4 |
| 15 | 1st bitplane | HH | level 5 |
| 16 | 3rd bitplane | LH/HL | level 1 |
| 17 | 3rd bitplane | HH | level 2 |
| 18 | 2nd bitplane | LH/HL | level 3 |
| 19 | 2nd bitplane | HH | level 4 |
| 20 | 4th bitplane | HH | level 1 |
| 21 | 3rd bitplane | LH/HL | level 2 |
| 22 | 3rd bitplane | HH | level 3 |
| 23 | 2nd bitplane | LH/HL | level 4 |
| 24 | 2nd bitplane | HH | level 2 |
| 25 | 4th bitplane | LH/HL | level 1 |
| 26 | 4th bitplane | HH | level 2 |

TABLE 2-continued

Order of importance of bitplanes and
subbands based on MSE weighting.

| order in i (least important, 1 = 1; to most important) | bitplane b(i) | subband s(i) | level l(i) |
|---|---|---|---|
| 27 | 3rd biplane | LH/HL | level 3 |
| 28 | 3rd bitplane | HH | level 4 |
| 29 | 2nd bitplane | LH/HL | level 5 |
| ... | ... | ... | ... |

The estimation algorithm uses that order and computes for each codeblock for order number i, the number of coding passes CP(b(i)) that contain the specific bitplane, b(i), in the subband, s(i), and the corresponding level, 1(i), namely $$CP(b(i))=CP-((\text{Max}B(s(I),1(i))-b(i))*3+1) \quad (2)$$

If that number is positive, a specific number of bits is subtracted from the codeblock bits. In one embodiment, the specific number of bits is computed as the average number of bits per coding pass in the specific subband, or the specific resolution. In the next step, order number (i+1), the derived number of bits is subtracted in a similar way from the codeblocks for bitplane b(i+1) of subband s(i+1) at level 1(i+1). In pseudo code, an exemplary estimation algorithm for the example target rate of 0.5 bits/pixel is expressed as follows.

```
Max_I=largest_order_number
target_rate = 0.5
new_B = B;
new_CP = CP;
i=1
while ((i≤max_i) && (new_rate>target_rate)){
    for each codeblock m in subband s(i)
        elim_CP[m](b(i)) = new_CP[m]-((MaxB(s(i), 1(i))-b(i))*3+1);
        if(elim_CP[m](b(i)) > 0)
            av_bits = new_B[m](s(i))/new_CP[m](s(i));
            new_B[m] -= av_bits*elim_CP[m](b(i));
            if(new_B[m]<0) new_B[m] = 0;
            new_CP[m] -= elim_cp[m](b(i));
        end
    end
    new_rate = sum(new_B*8)/ImageSize;
    i++;
end
```

New_B and new_CP are arrays of size of the number of codeblocks.

Once the target rate is reached, the new estimated bit values "new_B" are used in the entropy processing algorithms.

There are many alternatives to estimating a low bit rate image from a high bit rate image. In an alternative embodiment, another approach for estimation of low bit rate images may be used. This approach uses a model on the distribution of wavelet coefficients of an image.

It is assumed that the distribution of the wavelet coefficients can be described by a Gaussian or Laplacian distribution. The latter one is often used for modeling in the literature since distributions of many natural images are tested to follow the exponential distribution approximately. The Laplacian distribution has density $$f(x)=\lambda e^{-\lambda|x|} \text{ for } \lambda>0 \quad (3)$$

The theoretical definition of the entropy is $$H=-\Sigma p_i \log(p_i) \quad (4)$$

where $p_i$ is the probability of an event $A_i$, i.e. $p_i=P(A_i)$. For a lossy compressed image, the events are the situations that coefficients fall into specific quantization bins. In the case of scalar quantization with quantizer Q the event $A_i$ is described as the event that a coefficient is in the interval $[i*2^Q,(i+1)*2^Q)$, i.e.

$$p_i=P(A_i)=P(\text{wavelet coefficient } d \in [i*2^Q,(i+1)*2^Q)) \quad (5)$$

For the Laplacian distribution, this results in $$p_i=e^{-\lambda i 2^Q}-e^{-\lambda(i+1)2^Q} \quad (6)$$

If the parameter λ could be estimated from the header data of a coding unit, then the pdf of the coefficients in that coding unit could be estimated and the entropy for any given quantizer Q be determined.

The packet headers of a JPEG 2000 file include information on the number of zero bitplanes in a codeblock. From this information an estimation on the maximum absolute values of coefficients in that codeblock can be obtained by the variable MaxB from Equation 1. Using this variable, the parameter λ can be estimated as $$\lambda^*=\log_2(\text{\#coefficients per codeblock})/(2^{\text{MaxB}}) \quad (7)$$

By inserting this estimate into the formulas in Equations (6) and (4), an estimate for the entropy given a specific quantization is obtained. The value H yields bits per pixel. Since the codeblock length is measured in bytes, the estimated value H has to be multiplied by 8*(#coefficients per codeblock). A final algorithm may use the same order as the previously described method to reduce the number of bits in different subbands at different resolution levels successively. The reduction of bits is given by setting the quantizer to the bitplane parameter b(i) from Table 2.

Image Analysis Processing Algorithms

By exploiting the multi-scale entropy distribution that is accessible from the header, techniques may be used to perform image analysis or computer vision and similar operations such as, for example, but not limited to, segmentation, automatic scaling, resolution selection, and automatic region selection and cropping on the underlying image. Common prior art techniques are described in W. Pratt, *Digital Image Processing*, (2nd Edition), John Wiley & Sons, Inc., New York, N.Y., 1995, and A. Jain, *Fundamentals of Digital Image Processing*, Prentice Hall, Englewood Cliffs, N.J., 1995. In one embodiment, instead of the exact sample-wise multi-scale entropy distribution, the entropy distribution over local blocks of multi-scale coefficients (such as code blocks in JPEG 2000), a granular entropy distribution, is available. In one embodiment, the granular entropy distribution is used to process the underlying image.

As described herein, the use of multi-scale information from an image available in JPEG 2000 headers is demonstrated in the framework of several image analysis algorithms (or computer vision). In one embodiment, the header parameters that are used are PPM, PPT, SIZ, COD, COC, QCC and QCD. From these parameters, the location of codeblocks in the wavelet domain and the number of bits used by the encoder to encode the corresponding coefficients can be extracted. These numbers can be used to derive a bit distribution of the multi-scale representation of the image. The scale and spatial localization of codeblocks, and the multi-scale bit distribution inferred from headers lead to different image processing applications such a multiscale segmentation, automatic scaling, automatic scaling and cropping, and production of multiscale collage.

Segmentation

A classification technique assigns a class label to each small area in an image. Such an area can be an individual pixel or a group of pixels, e.g. pixels contained in a square block.

Various image analysis techniques use the class assignments in different ways, for example, the segmentation techniques separate an image into regions with homogeneous properties, e.g. same class labels.

Using the multi-scale entropy distribution, a scale is assigned as the class label to each image region, so that even if the coefficients from the finer scales is ignored, the visual relevant information about the underlying region is retained at the assigned scale. Such labeling identifies the frequency bandwidth of the underlying image features. Segmentation is posed as an optimization problem, and a statistical approach is invoked to solve the problem.

The location of codeblocks in the wavelet domain is given by the two-dimensional (2D) spatial location (i,k) and scale j. For example, if processing an image of size 512×512 and having codeblocks of size 32×32, there are 8×8 of size 32×32 codeblocks in each band of level 1, 4×4 codeblocks per band at level 2, and 2×2 codeblocks per band at level 3. The number of bits $B_j(i,k)$ per codeblock location (i,k) at level j for the three different bands LH, HL and HH at level j are added to yield the number of bits necessary to code the total coefficients at wavelet domain location (i,k). In practice, a linear or non-linear combination of the different entropies can also be used to help distinguish between vertical and horizontal features.

A scale $j \in \{1 \ldots J\}$ is assigned to each block of an image of size M×N, so that a cost function Λ is maximized, $$S_{opt} = \arg_{S \in \{1 \ldots J\}^{mn}} \Lambda(S, B) \quad (8)$$

where $S_{opt}$, is the optimal segmentation map for the entire image, S is one of the $J^{mn}$ possible labelings of blocks of size m×n, where there are $$\frac{M/2^j}{m} \times \frac{N/2^j}{n}$$

blocks of size m×n at level $j \in \{1 \ldots J\}$, with each block assigned one of the scales in $\{1 \ldots J\}$, and Λ(S,B) yields the cost given any segmentation S and any entropy distribution B.

In one embodiment, the prior art Maximum A Posteriori ("MAP") approach is adopted from statistics to solve the segmentation problem, because such an approach can be tuned to suit the final application. The basic ingredients used by MAP to set the cost function Λ are the likelihood P(B|S), which is the probability of the image's entropy distribution B, given segmentation map S, and prior P(S), which is the probability of the segmentation map S. The MAP cost function Λ is given by $$\Lambda(B,S)=P(B,S)=P(B|S)P(S)(\text{Bayes' rule}). \quad (9)$$

The MAP segmentation solution corresponds to optimizing equation (8), using equation (9).

The coefficients contained in a codeblock at level 1 contain information about a block of approximately twice the size in the pixel domain. If the pixel domain is divided into blocks of a specific size there are four times as many blocks in the pixel domain than codeblocks at level 1 of the wavelet decomposition, 16 times as many blocks in the pixel domain than codeblocks at level 2 of the wavelet decomposition, etc. Therefore, bits of a codeblock $B_j(i,k)$ of size n×n contribute information to a block in the pixel domain of size $2^j \times 2^j n$ at location $(i2^j n, k2^j n)$. Reversely, a pixel block of size n×n at location (x,y) receives a fraction of the bits, estimated as $\frac{1}{4^j}$, from codeblocks $B_j(i,k)$ with $$i = \left\lfloor \frac{x}{2^j} \right\rfloor \text{ and } k = \left\lfloor \frac{y}{2^j} \right\rfloor.$$

In one embodiment, the number of level-j bits associated with the pixel domain is defined as $$\hat{B}_j(x, y) = \frac{B_j(i, k)}{4^j} \quad (10)$$

The above calculation is equivalent to piece wise interpolation of the entropy values. Other interpolation algorithms such as, for example, polynomial interpolation or other non-linear interpolation, can be used as well to calculate the level j bits.

The cumulative weighted resolution-j entropy of a pixel block of size 2n×2n at location (x,y) is given by $$\hat{B}_j^{pixel}(x, y) = \sum_{l=1}^{J} \gamma_{j,l} \hat{B}_{il}(i, k) \quad (11)$$

with $$i = \left\lfloor \frac{x}{2^l} \right\rfloor \text{ and } k = \left\lfloor \frac{y}{2^l} \right\rfloor$$

for the locations i and k in $\hat{B}_j(i,k)$ in equation (10) and weights $\gamma_{j,l}$.

An example for a collection of weights is $$\gamma_{j,l}=0 \text{ for } 1<j \text{ and } \gamma_{j,l}=w_j \text{ for } l>j \quad (12)$$

with $w_0=1$, $w_1=3.5$, $w_2=5.5$, $w_3=13$, $w_4=20$. The parameters $w_i$ and the weights $\gamma_{j,l}$ may be changed depending on the application. The set of values $\hat{B}_j^{pixel}$ is called the cumulative weighted entropy of the image at resolution j.

The likelihood for the entropy $\hat{B}_j^{pixel}(x,y)$ of a pixel domain block at location (x,y) is set to be the value of $\hat{B}_j^{pixel}(x,y)$ relative to the total weighted bits for all levels associated with the pixel domain location (x,y), namely $$P\left(\hat{B}^{pixel}(x, y) \mid S(x, y) = j\right) = \frac{\hat{B}_j^{pixel}(x, y)}{\sum_{l=1}^{J} \hat{B}_l^{pixel}(x, y)} \quad (13)$$

Under the assumption of the pixel domain blocks being independent, the total likelihood is given by $$P(B \mid (S = j)) = \prod_{(x,y)} P\left(\hat{B}^{pixel}(x, y) \mid (S(x, y) = j)\right). \quad (14)$$

$\hat{B}_{pixel}$ provides a multiscale entropy distribution for the original image.

Now the prior P(s) has to be determined. The following discussion reflects existing knowledge about typical segmentation maps. There are many possible ways to choose the prior. For example, other ways to choose the prior are described in R. Neelamani, J. K. Romberg, H. Choi, R. Riedi, and R. G. Baraniuk, "Multiscale image segmentation using joint texture and shape analysis," in Proceedings of Wavelet Applications in Signal and Image Processing VIII, part of SPIE's International Symposium on Optical Science and Technology, San Diego, Calif., July 2000; H. Cheng and C. A. Bouman, "Trainable context model for multiscale segmentation," in Proc. IEEE Int. Conf. on Image Proc.—ICIP '98, Chicago, Ill., Oct. 4-7, 1998; and H. Choi and R. Baraniuk, "Multiscale texture segmentation using wavelet-domain hidden Markov models," in Proc. 32nd Asilomar Conf. on Signals, Systems and Computers, Pacific Grove, Calif., Nov. 1-4, 1998.

Because the segmentation map is expected to have contiguous regions, a prior is set on each location (x,y) based on its immediate neighborhood N(x,y), which consists of nine blocks (using reflection at the boundaries). The individual prior is $$P(S(x, y) | N(x, y)) = \frac{(\#(N(x, y) = s(x, y))^{\alpha}}{\sum_{j=1}^{J} (\#(N(x, y) = j))^{\alpha}}, \quad (15)$$

where #(N(x,y)=S(x,y)) is the number of neighbors which are the same as S(x,y), and α is a parameter that can be increased to favor contiguous regions; α=0 implies that the segmentation map blocks are independent of each other. In one embodiment, the overall prior is chosen as $$P(S) = \Pi_{x,y} P(S(x, y) | N(x, y)) \quad (16)$$

$$= \Pi_{x,y} (\#(N(x, y) = S(x, y))^{\alpha}. \quad (17)$$

In one embodiment, α equals 0.02 to 0.08. The desired segmentation map can now be obtained by optimizing the cost function Λ(S,B). A number of prior art iterative techniques may be used to search for the local maxima. One iterative technique involves first calculating the initial segmentation map that optimizes the cost function using α=0 in equation (12). The segmentation map maximizing the resulting cost function is obtained because the vector optimization decouples into a scalar optimization problem. The segmentation map is given by $$S^0(a, b) = \arg\max_{j \in \{1 \ldots J\}} P(\hat{B}^{pixel}(x, y) | S(x, y) = j), \quad (18)$$

for all (x, y)

For all (x,y), the segmentation map at (x,y) is updated using $$S^m(x, y) = \quad (19)$$

$$\arg\max_{j \in \{1 \ldots J\}} P(\hat{B}^{pixel}(x, y) | S(x, y) = j) P(S(x, y) = j | N(x, y)),$$

where N(x,y) is obtained from $s^{m-1}$. Each iteration, m is incremented to m=m+1. The iterative loop is repeated until $S^m = S^{m-1}$. The iterative algorithm always converges, because the cost function Λ(B,$S^m$) is a non-decreasing function with iterations m, and the cost function is bounded. The $S^m$ obtained after convergence is the segmentation estimate.

The actual segmentation output in terms of labeling of regions is then given by the maximization of the MAP cost function $$\Lambda(B, S_m) = P(B|S_m) \cdot P(S_m), \quad (20)$$

as stated in equation (3) above.

Figure 2:
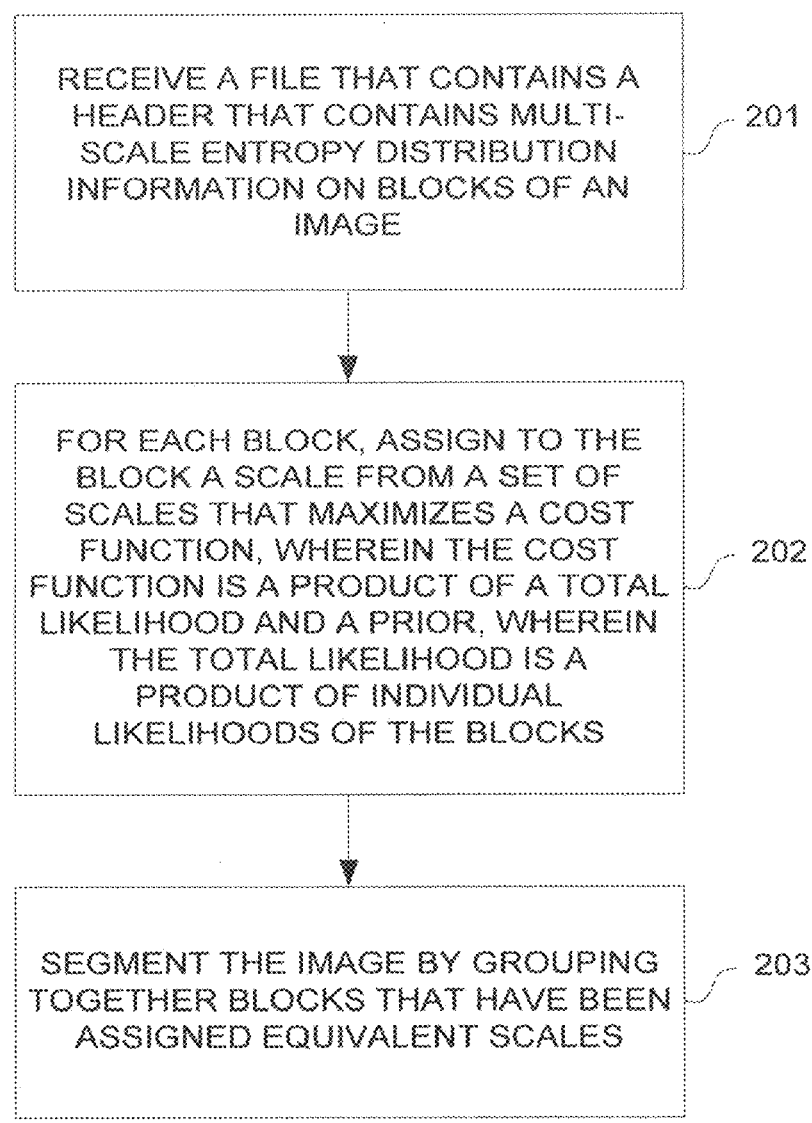
FIG. 2 is a flow diagram illustrating one embodiment of a process for segmenting an image.

FIG. 2 is a flow diagram of one embodiment of a process for segmenting an image. Referring to FIG. 2, in process block 201, a file that contains a header that contains multi-scale entropy distribution information on blocks of an image is received. In one embodiment, the file represents an image in JPEG 2000 format. In process block 202, for each block, a scale from a set of scales is assigned to the block that maximizes a cost function. The cost function is a product of a total likelihood and a prior. The total likelihood is a product of likelihoods of the blocks. In one embodiment, each likelihood of a block is proportional to a summation, for each scale in the set of scales, of a product of a weight of the scale and a number of bits spent to code the block at the scale. In one embodiment, the number of bits spent to code the block at the scale is a numerator divided by a denominator. The numerator is an entropy distribution of a multi-scale coefficient of the block at the scale. The denominator is four raised to the power of the scale. In process block 203, the image is segmented by grouping together blocks that have been assigned equivalent scales.

Figure 3:
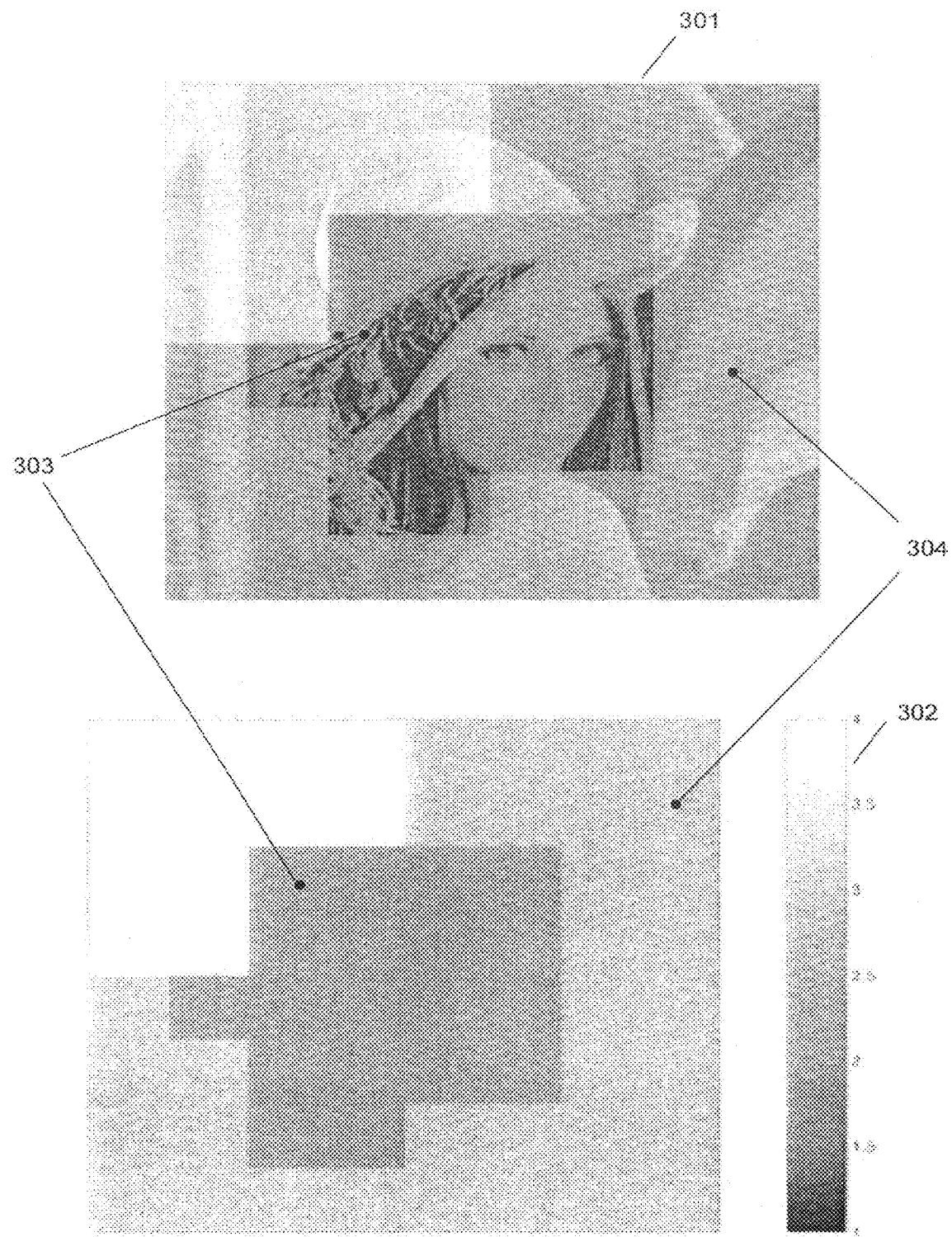
FIG. 3 illustrates a segmentation map superimposed on an exemplary image of a woman.

FIG. 3 illustrates a segmentation map superimposed on an exemplary image of a woman. In one embodiment, the segmentation process (set forth above) labels the face regions of the image 301 with finer scales, and labels the background regions with coarser scales to reflect the underlying features in the image. The different shades show that the regions with different types of features are identified differently. In one embodiment, the segmentation process assigns a scale to the different regions on the basis of the underlying features. The color-bar 302 on the right shows the scales assigned to the different regions. Regions such as the face which contain many edges are labeled with a fine scale 303. In contrast, the background regions are assigned coarser scales 304.

Figure 4:
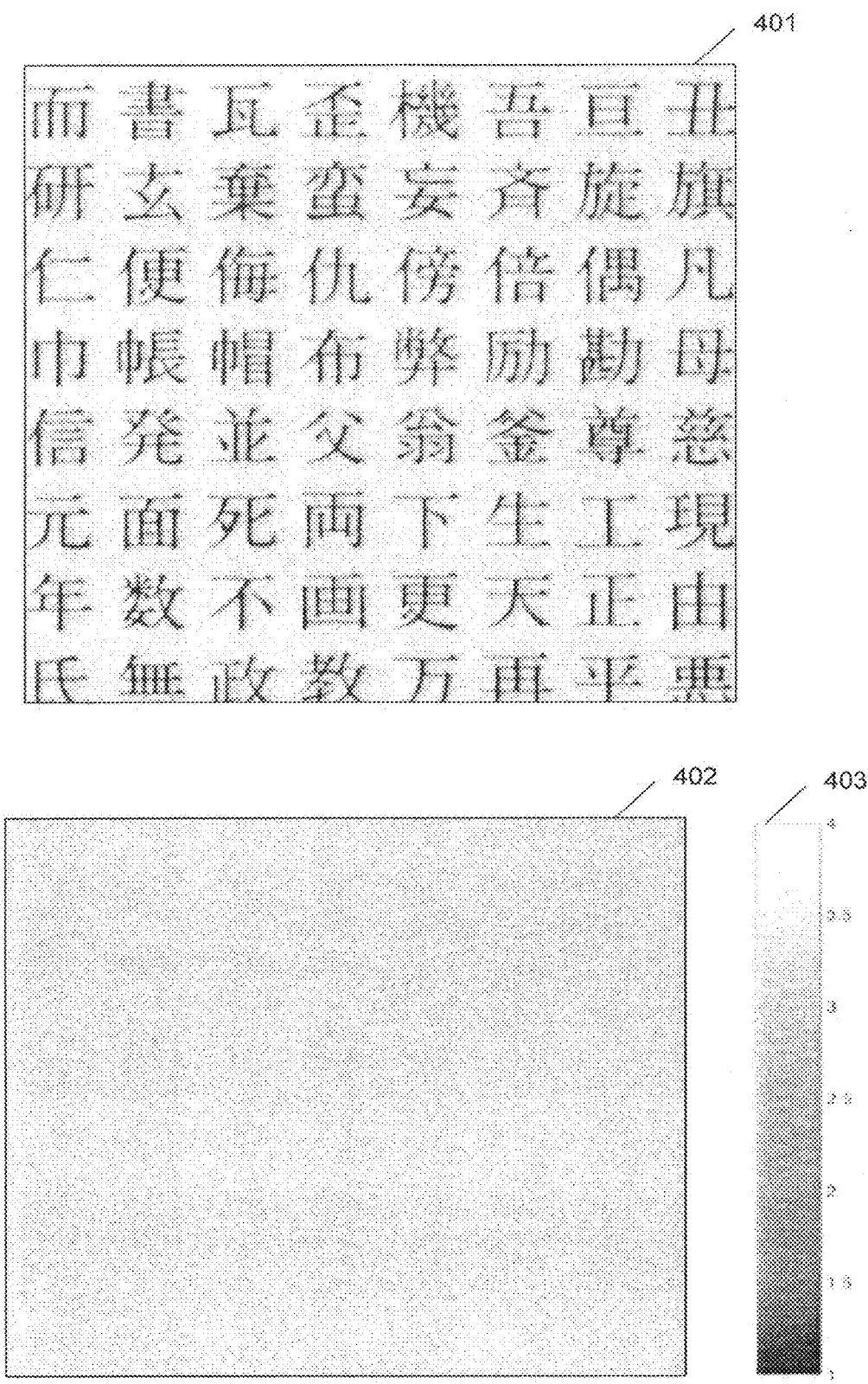
FIG. 4 illustrates a segmentation map superimposed on an exemplary image of Japanese text.

FIG. 4 illustrates a segmentation map superimposed on an exemplary image of Japanese text. Since the segmentation map 402 is uniform, the superimposition does not change the appearance of the original image 401. In one embodiment, the segmentation process attempts to assign a scale to the different regions on the basis of the underlying features. The color-bar 403 on the right shows the scales assigned to the different regions. Since the image 401 has uniform features, the algorithm has uniformly assigned the scale 3 to all regions in the image 401. In one embodiment, the image coders in these examples used JPEG 2000 Part I reversible wavelet filters, five levels of decomposition, code-block size 32×32, and a bit rate of 0.2 bits per pixel on gray scale images.

The results can be extended to color images. A linear or non-linear combination of the multi-scale entropy allocations among the different color components can be used for segmentation. Segmentation can be performed on only one component such as luminance or green. A segmentation algorithm can be run on each component separately, and then combined using voting or by a MAP method.

In one embodiment, the resolution of the final results are limited by the granularity (coarseness) of the multi-scale entropy distribution; typically, the resolution of the final results with respect to the underlying image is limited to multiples of the code-block size. In one embodiment, when precincts are employed, better resolution can be obtained if the precinct boundaries cause the code blocks to be split.

Automatic Resolution Selection

It is often desirable to know the best scale such that even if all finer scale coefficients are thrown away, the retained coefficients contain sufficient information to identify the image. This may be used, for example, with digital cameras. Since entropy is a good measure for visual information, this may be used as a measure for the amount of visual information that is lost when an image is represented at scale j. Furthermore, the multi-scale representation helps to identify the approximate areas in the image that lose their visual information during image scaling. The best scale is estimated as follows. For each scale j, the importance of a given group of multi-scale coefficients $S_{i,j}$ to reconstruct the respective part of the image is analyzed. The relative importance of the coefficient is inferred by comparing their entropy to a scaled factor of the mean entropy from the immediate coarser level j+1 or combination of all coarse levels j+1 . . . J. $S_{i,j}$ is significant if $B < \beta \mu_{j+1}$ and insignificant if $B \leq \beta \mu_{j+1}$, where $\mu_{j+1}$ is the mean of the number of bits per block at the coarser scale j+1, and $\beta$ is a threshold parameter that dictates significance. In one embodiment, $\beta$ is 0.3.

For each scale j, measure the percentage P(j) of the image area that the significant coefficients at level j cover. P(j) measures the area that would lose a significant amount of information, if the significant coefficients at level j are thrown away (when the image X is scaled down by a factor $2^j$, then all coefficients at levels 1 . . . j are lost in the scaled down image). The coarsest possible scale $J_{opt}$ is chosen so that at least P* percent of the area is still significant, i.e., $$P(J_{opt}) > P^*, \quad (21)$$

where P* is a threshold parameter that sets the minimum percentage of area that needs to be recognizable. In one embodiment, P* equals 35%. The best scale that retains sufficient information about the image is $J_{opt}$. Hence, even if the image is scaled down by a factor of $2^{J_{opt}-1}$ on all sides, the image would still contain sufficient information in the remaining coefficient to facilitate recognition of the image. It is possible to also set the significance threshold based on all the coarser scale coefficients, or based on only some of the coarser scale coefficients.

Figure 5:
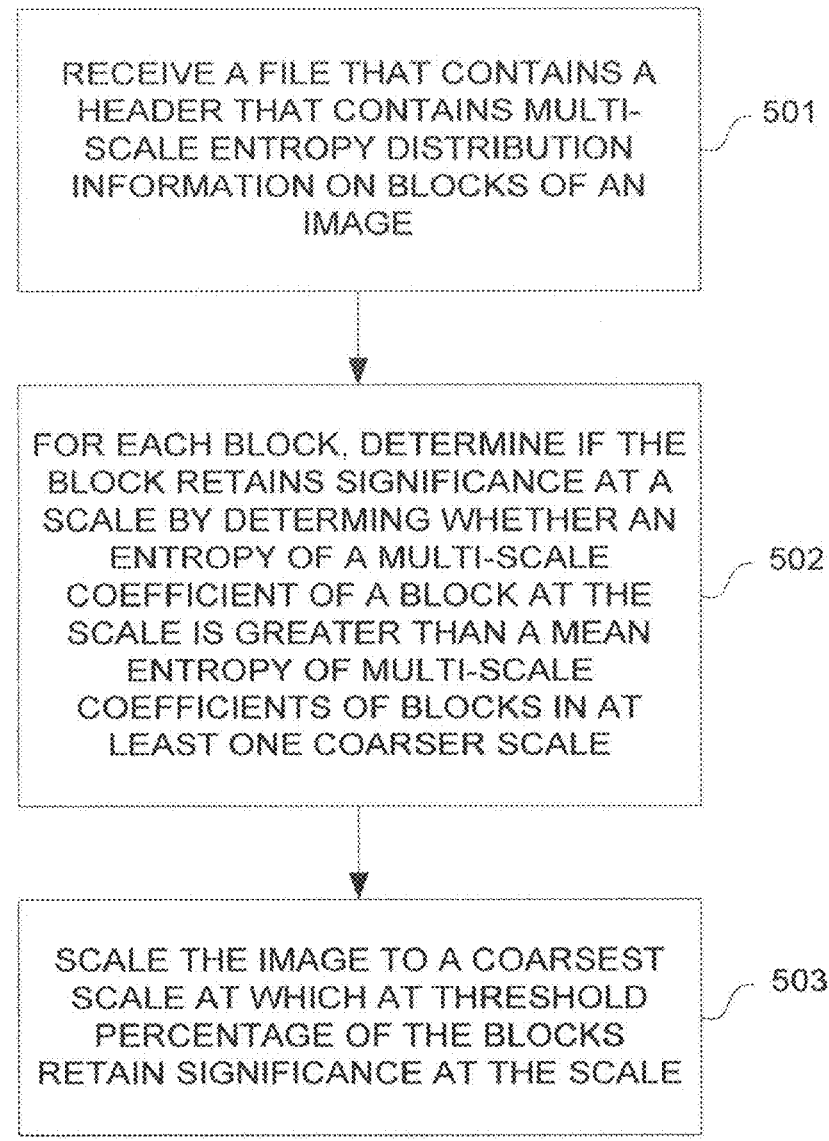
FIG. 5 is a flow diagram of one embodiment of a process for adaptively scaling an image.

FIG. 5 is a flow diagram of one embodiment of a process for adaptively scaling an image. In process block 501, a file is received that contains a header that contains multi-scale entropy distribution information on blocks of an image. In one embodiment, the file represents an image in JPEG 2000 format. In process block 502, for each block, it is determined that the block retains significance at a scale upon a determination that an entropy of a multi-scale coefficient of a block at the scale is greater than a mean entropy of multi-scale coefficients of blocks in at least one coarser scale. In one embodiment, the mean entropy is a mean bit distribution multiplied by a threshold parameter. In process block 503, the image is scaled to a coarsest scale at which a threshold percentage of the blocks retain significance at the scale.

Figure 6:
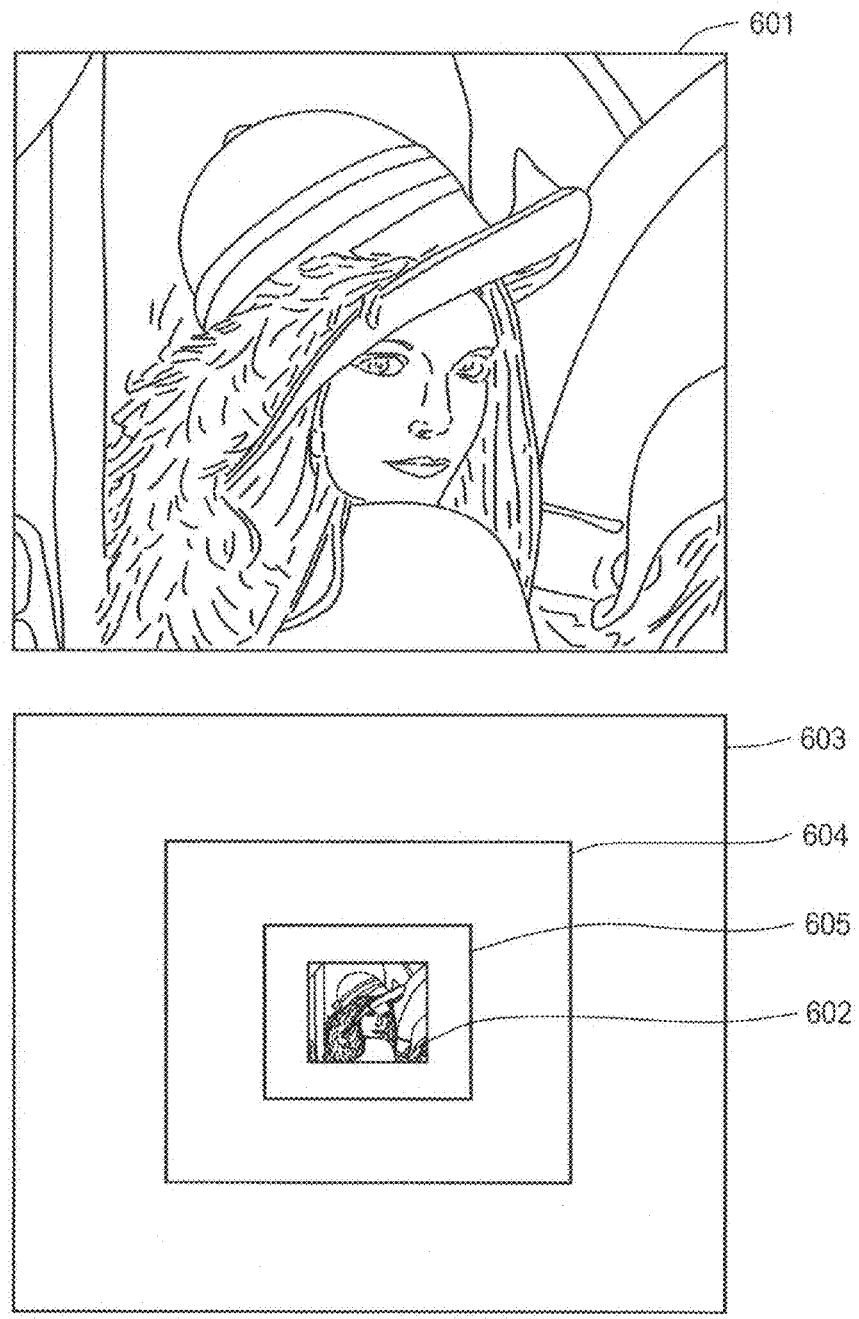
FIG. 6 illustrates adaptive scaling of an exemplary image of a woman.
Figure 7:
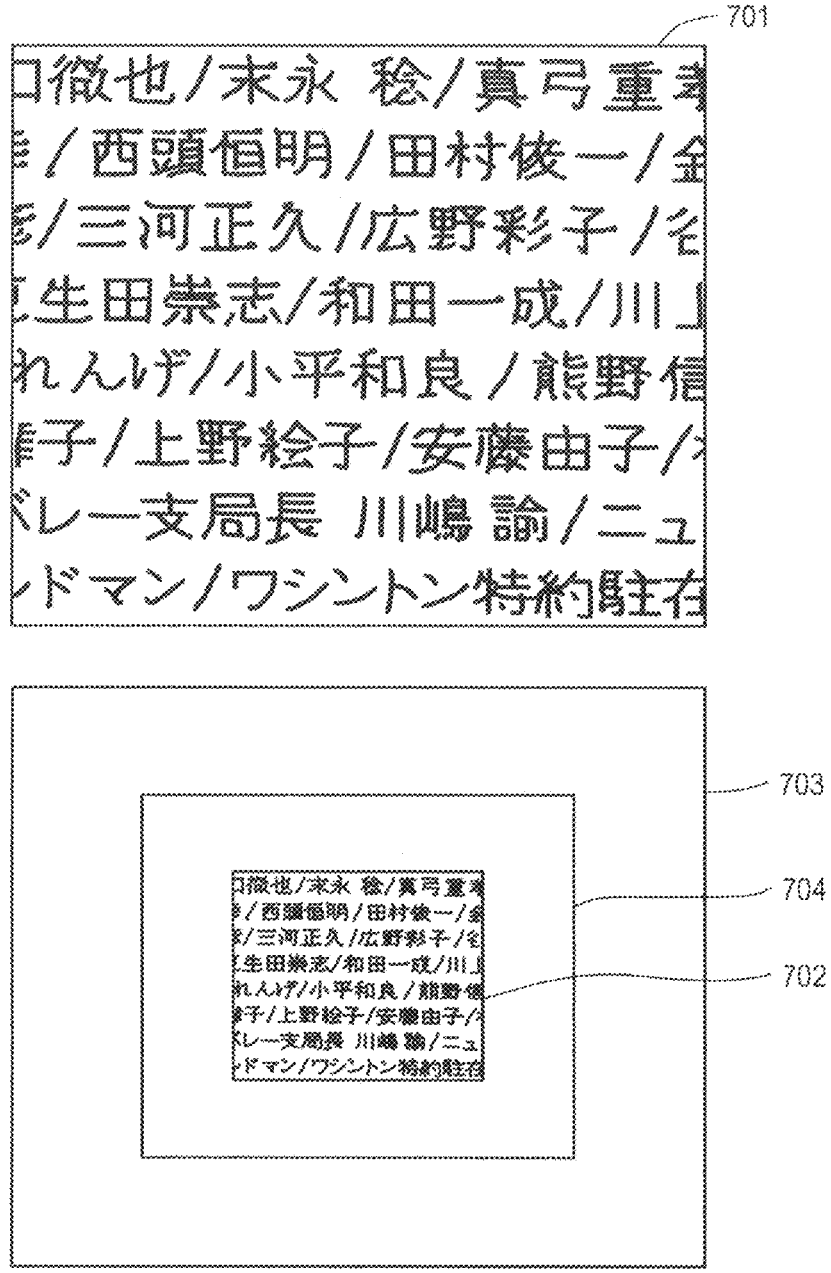
FIG. 7 illustrates adaptive scaling of an exemplary image of Japanese text.

FIG. 6 illustrates adaptive scaling of an exemplary image of a woman. The size of the original image 601 is 512 by 512 pixels. The size of the scaled image 602 is 64 by 64 pixels. The black boxes 603, 604, and 605 display the different possible choices for the scaled image size. In one embodiment, the scaling is determined using a recognizable area of 35% and a significance threshold factor of 0.3. FIG. 7 illustrates adaptive scaling of an exemplary image of Japanese text. The size of the original image 701 is 512 by 512 pixels. The size of the scaled image 702 is 128 by 128 pixels. The black boxes 703 and 704 display the different possible choices for the scaled image size. In one embodiment, the scaling is determined using a recognizable area of 35% and a significance threshold factor of 0.3. The scale selection algorithm set forth above may choose different scales for different images. The image 601 of the woman is, according to one embodiment, downsampled by a factor of $2^3$ times, while the image 701 of Japanese text is, according to one embodiment, downsampled by a factor of $2^2$. The differences in the scales arises because the Japanese text image 701 has important components (reflected as higher entropy) in the higher frequency bands relative to the image 601 of the woman.

Given the significance threshold $\beta$, the labeling of a codeblock as significant or insignificant can be also performed by modeling the entropy of all the codeblocks in one resolution level as a mixture of two probability distributions, e.g., two Gaussian distribution with different mean $\mu_1$ and $\mu_2$, and different standard deviations, $\sigma_1$ and $\sigma_2$. From the entropy values smaller than the significance threshold, the parameters $\mu_1$ and $\sigma_1$ are estimated. Given those two pdfs $f_1$ and $f_2$, the probability of an entropy value x belonging to $f_1$ is estimated. This method is a standard procedure as explained, e.g., Duda, Hart, Stork, Pattern Classification ($2^{nd}$ ed.), Wiley, New York, N.Y. 2000. The probability distribution of the codeblocks at each resolution is then fed into a multiscale segmentation algorithm as described above.

Given the significance threshold $\beta$, the optimal scale $J_{opk}$ can also be selected as:

$$J_{opt} = \arg\min_j \left( \sum_{l=j}^{J} \sum_{i,k} B_l(i,k) \leq \left( B \sum_{l=1}^{J} \sum_{i,k} B_j(i,k) \right) \right). \quad (22)$$

Fixed-Size-Window Automatic Cropping and Scaling

Often, an image is constrained to be represented within a fixed size in pixels. Under such constraints, it is desirable to choose the "best" representation of the image that satisfies the given size constraints. Since entropy is a good measure for visual information, an image representation is obtained that encompasses the maximum entropy, while still satisfying the size constraints.

The weighted cumulative entropy $\hat{B}_j^{pixel}$ from equation (11) is used as an input to a maximization algorithm for determination of the best scale (or resolution level) of an image convolved with a local indicator function. The weights may be chosen as in the segmentation section as $\gamma_{j,i} = 0$ for $1 < j$ and $\gamma_{j,i} = 1$ for $1 \geq j$ A two dimensional indicator function I is constructed with support dictated by the shape and size constraints of the application. For example, if the desired shape constraint is a rectangle and the size constraints are the pixel dimensions m×n, then the indicator function for a rectangle of size m×n located at position $(x_0, y_0)$ is given by $$I_{m,n}[x_0, y_0](p, q) = \begin{cases} 1, & \text{for } p \in [x_0, x_0 + m], q \in [y_0, y_0 + n] \\ 0, & \text{otherwise} \end{cases} \quad (23)$$

The "best" location (a*,b*) of the rectangle placed at the "best" level j* is computed as $$\{(a^*, b^*), j^*\} = \operatorname{argmax}_{a,b,j} \sum_{p=1}^{M} \sum_{q=1}^{N} \hat{B}_j^{pixel}(p, q) I_{2^j m, 2^j n}[a, b](p, q) \kappa_j(a, b), \quad (24)$$

where $\kappa_j(a,b)$ is a matrix that controls the relative spatial and scale importance of the entropy. The size of $\kappa_j(a,b)$ is the same at all scale. (In order to deal with images that are centered, as well as to incorporate the natural human tendency, a heuristic that is not incorporated into most image coders, the $\kappa(a,b)$ are typically chosen such that the central portions of the image are weighed more than the entropies at the edges of the image.) For 512×512 images with 32×32 codeblock size, an example is given. An example for a set of spatial importance weighting matrices for j=1,2,3,4 is $\kappa_2 = \kappa_1 = \text{mask1} * 64 / \|\text{mask1}\|$, mask1=[(1.0 1.1 1.2 1.3 1.3 1.2 1.1 1.0)×(1.0 1.1 1.2 1.3 1.3 1.2 1.1 1.0)$^T$], $\kappa_3, \kappa_4 = \text{mask2} * 64 / \|\text{mask2}\|$, mask2=[11111111]×[11111111]

and $\|\text{mask1}\|$ denotes the $L^1$-norm of the masking matrix.

Multiplying the cumulated weighted entropy at resolution j with mask1 means weighting the entropy values linearly decreasing from 1 to 0.77 from the center towards the edges of the image at resolution j.

The best representation of the image is then obtained by theoretically computing the image at resolution j* and cropping out of that low-resolution image a rectangle of size m×n located with the lower left corner at position (a*/$2^{j^*}$,b*/$2^{j^*}$). This procedure is practically done by decoding only the codeblocks of the JPEG 2000 codestream that contribute to that cropped part of the j*-reduced resolution image and performing an inverse transform on those data to create actually cropped image.

Figure 8:
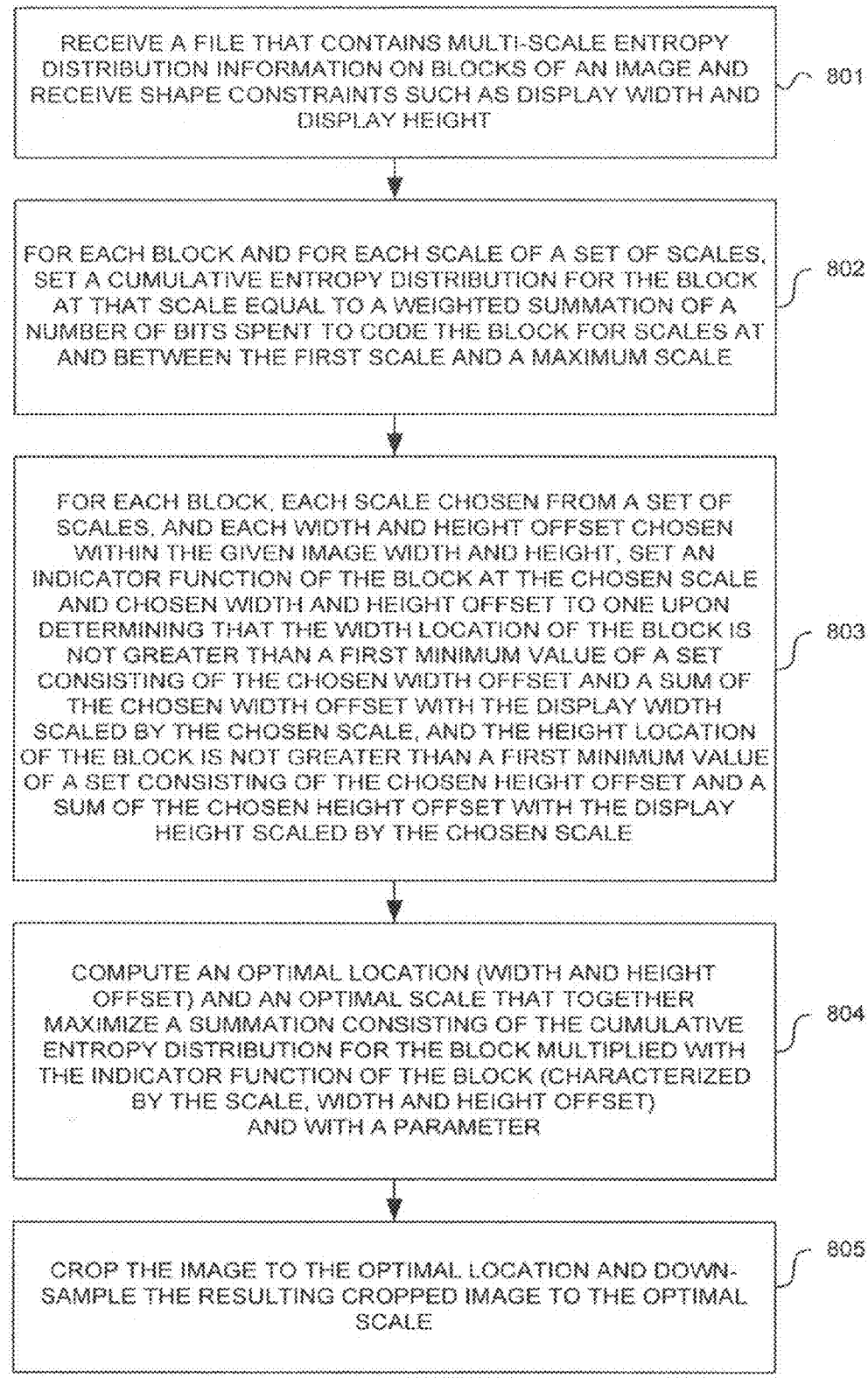
FIG. 8 is a flow diagram of one embodiment of a process for automatically scaling and cropping an image.

FIG. 8 is a flow diagram of one embodiment of a process for automatically scaling and cropping an image. The process is performed by processing logic that may comprise hardware (e.g., circuitry, dedicated logic, etc.), software (such as is run on a general purpose computer system or a dedicated machine), or a combination of both.

Referring to FIG. 8, at processing block 801, a file that contains a header that contains multi-scale entropy distribution information on blocks of an image is received, along with a shape constraint, such as display width and display height. In one embodiment, the file represents an image in JPEG 2000 format.

At processing block 802, for each block and for each scale of a set of scales, a cumulative entropy distribution for the block at that scale is set equal to a weighted summation of a number of bits spent to code the block for scales at and between the first scale and a maximum scale.

At processing block 803, for each block and each scale chosen from a set of scales, and each width and height offset chosen within a given image width and height, an indicator function of the block at the chosen scale and chosen width and height offset is set to one upon determining that a width location of the block is not greater than a first minimum value of a set consisting of the chosen width offset and a sum of the chosen width offset with the display width scaled by the chosen scale, and the height location of the block is not greater than a first minimum value of a set consisting of the chosen height offset and a sum of the chosen height offset with the display height scaled by the chosen scale. Otherwise, the indicator function is set to zero otherwise. The first minimum value is a minimum value of a set consisting of a width of the image and a sum of the width of the block plus one plus a desired height scaled by the first scale. The second minimum value is a minimum value of a set consisting of a height of the image and a sum of the height of the block plus one plus a desired width scaled by the first scale.

At processing block 804, an optimal location (width and height offset) and an optimal scale are computed that together maximize a summation consisting of the cumulative entropy distribution for the block, multiplied by the indicator function of the block (characterized by the scale, width and height offset) and with a parameter. At processing block 805, the image is cropped to the optimal location and the resulting cropped image is down-sampled to the optimal scale.

Figure 9:
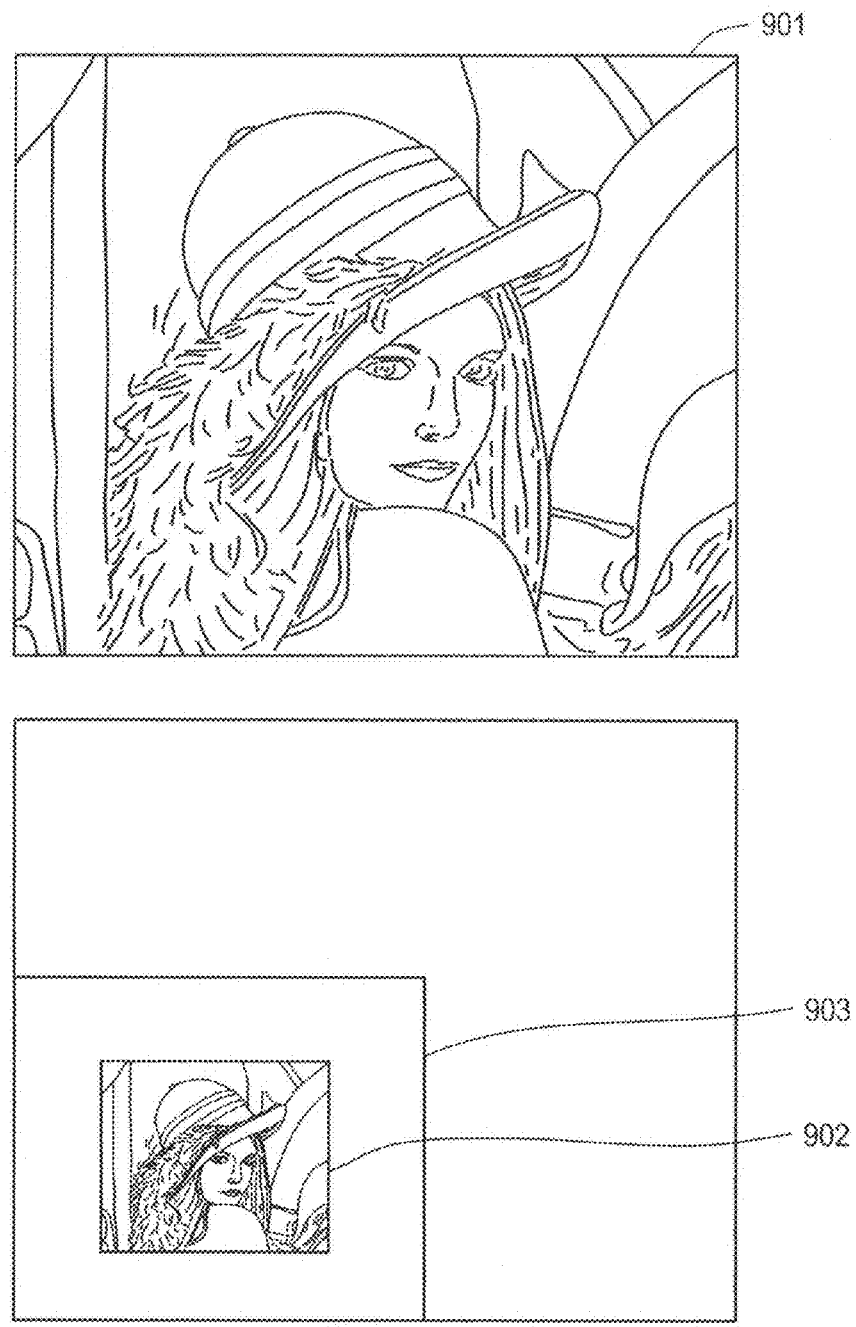
FIG. 9 illustrates automatic scaling and cropping of an exemplary image of a woman.

In one embodiment, the above process simultaneously chooses the region and its scaling factor for the images. FIG. 9 illustrates automatic scaling and cropping of an exemplary image of a woman according to one embodiment. The size of the original image 901 is 512 by 512 pixels. The maximum size of the representation 902 is constrained to be 192 by 192 pixels. To accommodate the final representation 902 within 192 by 192 pixels, the process selects the important face region of the woman, and then scales it down by a factor of two. The fixed size representation 902 does not contain the unimportant background regions. The black box 903 displays the region with respect to the original image that is being considered in the representation.

Figure 10:
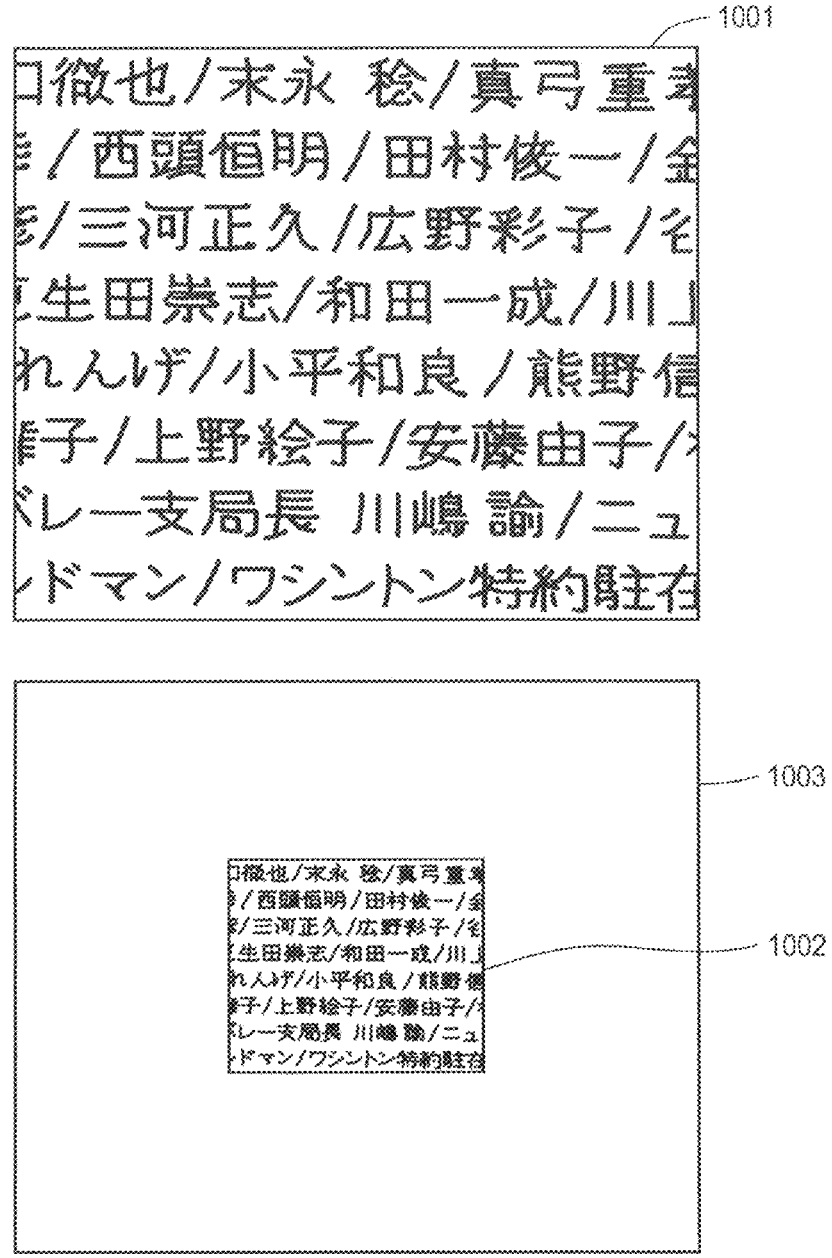
FIG. 10 illustrates automatic scaling and cropping of an exemplary image of Japanese text.

FIG. 10 illustrates automatic scaling and cropping of an exemplary image of japanese text. The size of the original image 1001 is 512 by 512 pixels. The maximum size of the representation 1002 is constrained to be 192 by 192 pixels. The algorithm's best 192 by 192 pixel representation 1002 for the japanese text image 1001 is simply the whole image 1001 scaled down appropriately. The black box 1003 displays the region with respect to the original image that is being considered in the representation. The whole Japanese text image 1001 is scaled down to obtain the representation 1002.

Display Constraints

Display space is often a constraint on any device. Under such circumstances, it is desirable to obtain a device dependent, meaningful, condensed representation of images. By combining header-based processing with display adaptation techniques, a variety of meaningful and condensed image representations can be provided. The display device characteristics set an upper and lower bound on the size of the image to be represented. Since the automatic scaling process set forth above suggests a scale which ensures that most of the image information is still retained in the scaled down image, a scale can be chosen between the bounds dictated by the display device that is closest to the suggested scale.

Often, the size (e.g., in pixels) available to represent an image is fixed. In such a case, it is desirable to find the best representation of the image that can be accommodated within the available pixels. The automatic region selection and scaling technique set forth above can provide the best fixed-size representation of the image, by exploiting the multi-scale entropy distribution. The parameters in the process can be chosen to tune the representation to specific display devices.

Applications

One approach to compressing digital video sequences is to compress each video frame independently using a multi-resolution image coder. For example, the Motion JPEG 2000 standard uses multi-scale transform-based compression on each video frame independently. Since our proposed algorithms can effectively process these frames, the aforementioned processing can be applied to Motion JPEG 2000 as well. For example, by setting the segmentation process parameters such as $\alpha$ and $\gamma_{j,k}$ appropriately, "active" regions, such as people from the background in a single video frame, can be identified. This can be utilized to allocate more bits to the active regions in the next frame, so that the people can be better identified if required. Significant changes in the entropy allocation with time across frames can also be exploited to detect motion in the video. This may have special applications in surveillance cameras.

An aim of image classification is to automatically sort through an image database, and group images of similar types such as natural images, portraits, documents, uniform textures, etc. Segmentation maps obtained by processing the multi-scale entropy distributions can be an exploited as a feature to perform broad classifications. The classification can be fine-tuned later using more intensive and specialized processing.

An aim of image retrieval is to identify images that are similar to some template image. Since good image retrieval algorithms are intensive and require the actual image to perform their analysis, header-based segmentation maps can be exploited to reduce the number of images that need to be decoded and fed to the specialized image-retrieval algorithms.

The segmentation process set forth above can be used to provide an approximate segmentation that splits the image into regions containing coarse scale features and regions containing fine scale features. For example, in document images, the segmentation algorithm can approximately distinguish the text regions from the images. The approximate segmentation can be input to a more intensive pattern analysis algorithm such as optical character recognition ("OCR") for further analysis.

The segmentation technique set forth above can be used to create an abstract collage representation of the image, where different regions of the image are scaled more (or less) depending on whether the features contained in the region are coarse or fine. Such an abstract representation of an image can possibly be used in many graphical user interface ("GUI") image communication applications such as web-browsers.

Multiscale Collage

For the calculation of a multiscale collage of an image as a first step a segmentation as in Segmentation section described above is performed. After this, rectangles are fitted to the segmented image in the following way.

A multi-scale probability distribution such as the MAP cost function $\Lambda(\hat{B}^{pixel}, S_m)$ from Equation (6) or the result of a monotonic transformation such as $\log \Lambda(\hat{B}^{pixel}, S_m)$ is used as an input to a technique for fitting rectangles. The goal is to find at each level j the rectangle whose probabilities are most similar to the probability at a larger level j*. That means the content inside the rectangle has most likely meaningful content at all scales m, $j \leq m \leq j^*$. Its corresponding image part is therefore likely to be well represented at resolution j. Once the rectangle is found the locations of entries covered by the rectangle are marked as 'already counted' while the corresponding probability values are penalized by adding a large value (e.g., 10). Once this procedure has been performed for all levels, the rectangle and level is chosen that yields the minimal difference in probabilities to the rectangle at level j*. The position and size of the rectangle as well as the associated level is saved in a list. In the next iteration step the procedure is applied again to the penalized probabilistic distribution function (pdf) unit all codeblock locations of the image labeled as "already counted". The information in the final list represents a rectangular multiscale partition of the image.

Figure 11A:
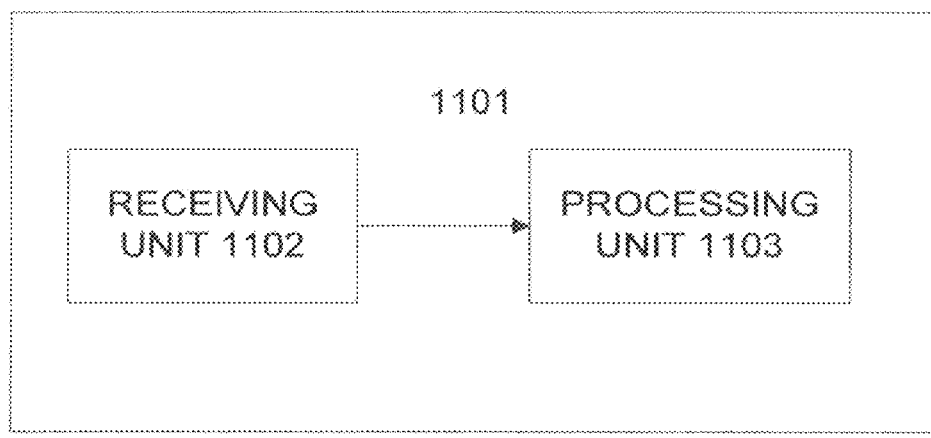
FIG. 11A is a block diagram of one embodiment of an apparatus to perform the processing described herein.

FIG. 11A is a schematic diagram of an apparatus to segment an image, to adaptively scale an image, or to automatically scale and crop an image. Referring to FIG. 11A, the apparatus 1101 comprises a receiving unit 1102 to receive a file that contains a header that contains multi-scale entropy distribution information on blocks of an image. In one embodiment, the file represents an image in JPEG 2000 format. The apparatus 1101 further comprises a processing unit 1103 coupled with the receiving unit 1102. In one embodiment, the processing unit 1103 is to, for each block, assign to the block a scale from a set of scales that maximizes a cost function. The cost function is a product of a total likelihood and a prior. The total likelihood is a product of likelihoods of the blocks. In one embodiment, each likelihood of a block is proportional to a summation, for each scale in the set of scales, of a product of a weight of the scale and a number of bits spent to code the block at the scale. In one embodiment, the number of bits spent to code the block at the scale is a numerator divided by a denominator. The numerator is an entropy distribution of a multi-scale coefficient of the block at the scale. The denominator is four raised to the power of the scale.

In one embodiment, processing 1103 groups together blocks that have been assigned equivalent scales to segment the image. In one embodiment, processing unit 1103, for each block, determines that the block retains significance at a scale upon determining that an entropy of a multi-scale coefficient of a block at the scale is greater than a mean entropy of multi-scale coefficients of blocks in at least one coarser scale. In one embodiment, the mean entropy is a mean bit distribution multiplied by a threshold parameter.

In one embodiment, processing unit 1103 further scales the image to a coarsest scale at which a threshold percentage (e.g., 35% as described above as the threshold parameter P*) of the blocks retain significance at the scale.

Processing unit 1103, may, for each block and for each first scale of a set of scales, set a cumulative entropy distribution for the block at the first scale equal to a summation of a number of bits spent to code the block for scales at and between the first scale and a maximum scale.

Processing unit 1103 may, for each block and for each first scale of a set of scales, set an indicator function of the block and the first scale to one upon determining that a width of the block is not greater than a first minimum value and a height of the block is not greater than a second minimum value and to zero otherwise. The first minimum value and second minimum values are the same as described in FIG. 8.

In one embodiment, processing unit 1103 further computes an optimal location and an optimal scale that together maximize a summation, for each block in the optimal location at the optimal scale, of the cumulative entropy distribution for the block at the optimal scale, multiplied by the indicator function of the block and the optimal scale, multiplied by a parameter (e.g., $\kappa$ described above).

Then, processing unit 1103 crops the image to the optimal location and down-sample a resulting cropped image to the optimal scale.

Figure 11B:
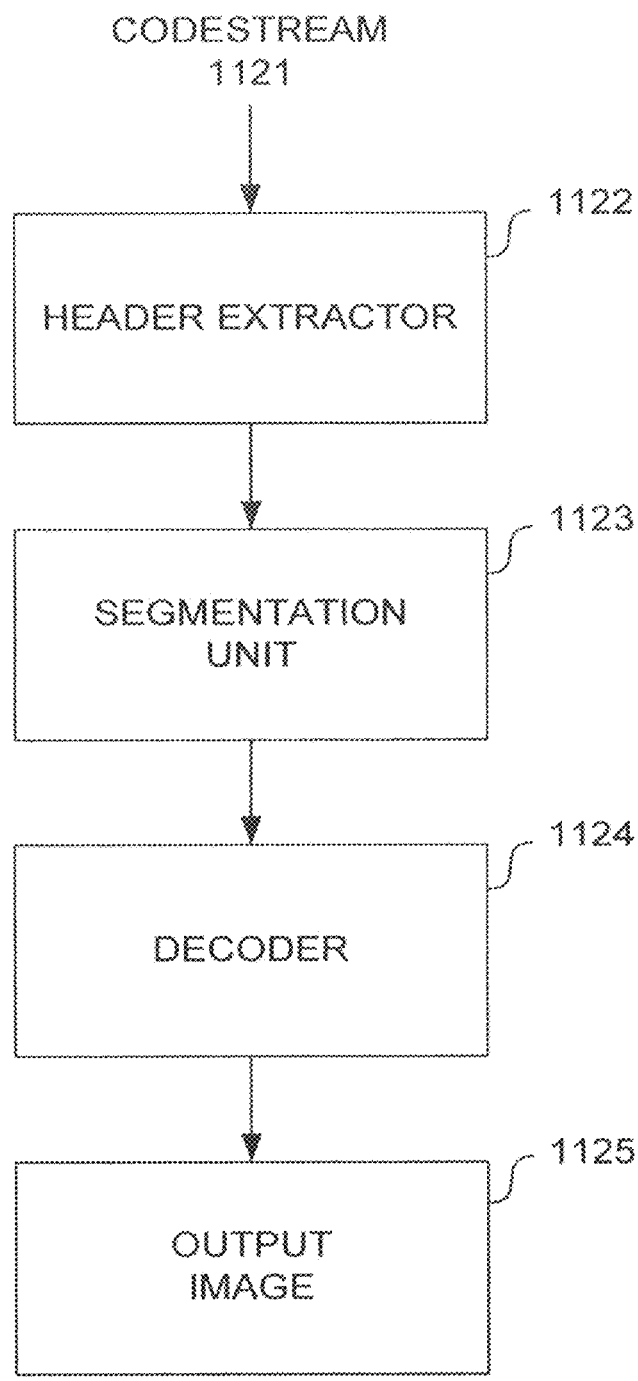
FIG. 11B is a block diagram of an alternative embodiment of an apparatus to perform the processing describe herein.

FIG. 11B is block diagram of one embodiment of a codestream processor for use in an image processing system.

Referring to FIG. 11B, codestream 1121 is received by header extractor 1122 that extracts header information. Segmentation unit 1123 performs segmentation on the codestream using the extracted header information from header extractor 1122. In one embodiment, segmentation unit 1123 determines which codeblocks of codestream 1121 to decode and signals decoder 1124. Decoder 1124 decodes codeblocks necessary for the segmented image portion (e.g., a region at a specified resolution.)

Quantitative Example

The value of header-based processing is demonstrated in the example of creating a good 128×128 thumbnail representation of 1024×1024 image. An image analysis process described herein is the one for automatic cropping and scaling as described above. The complexity of processed data compared to traditional image processing of a JPEG 2000 image and a raster image is listed in Table 3. The advantage over an image in JPEG 2000 form is that only $\frac{1}{1000}$ of the data must be used by the segmentation algorithm and less than ½ of data must be decoded.

TABLE 3

Quantitative example of header-based processing

| | Multiscale forward wavelet transform | Amount of data processed by segmentation algorithm | Amount of decoding |
|---|---|---|---|
| Raster image | 1024 × 1024 | 1024 × 1024 | — |
| JPEG 2000 | — | 1024 × 1024 | 1024 × 1024 |
| JPEG 2000 (header processing) | — | 32 × 32 (0.001% of above) | ~33% of above |

An Exemplary Computer System

Figure 12:
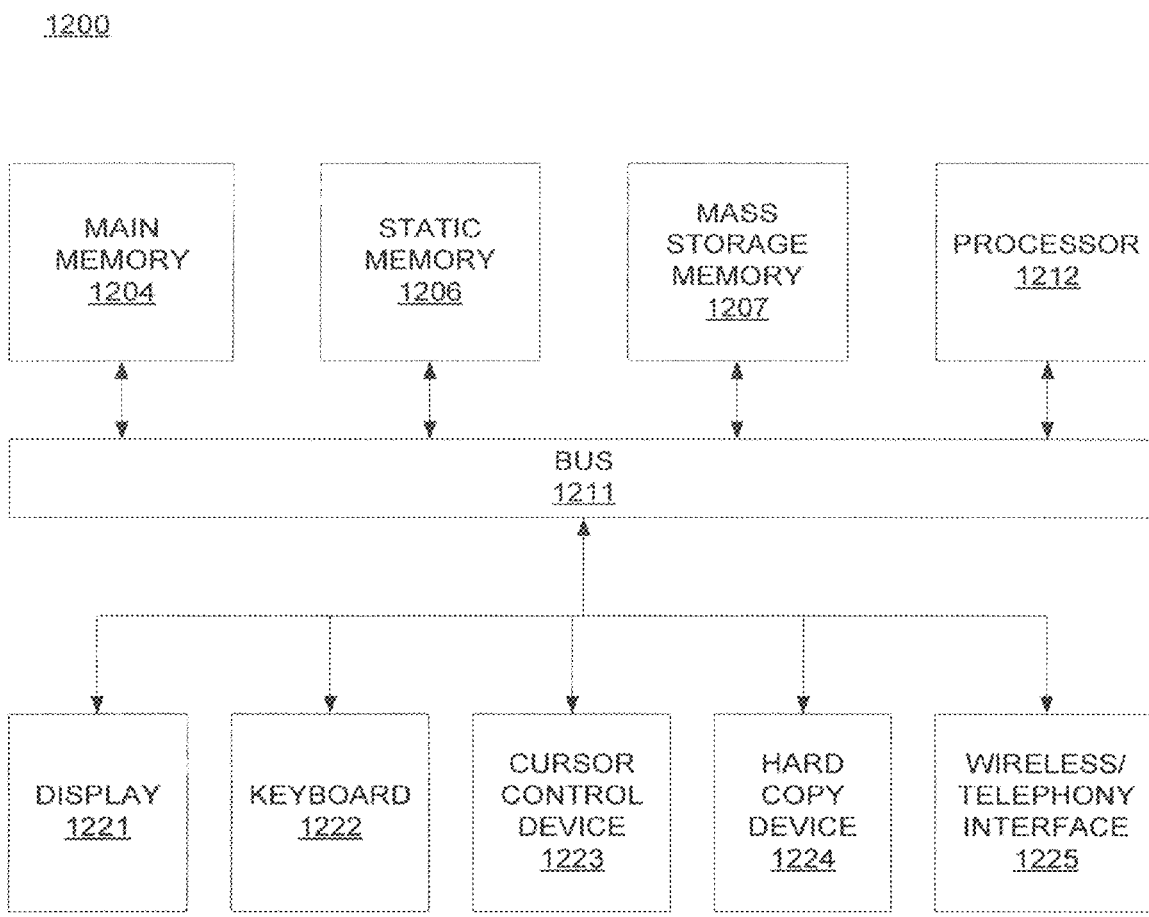
FIG. 12 is a block diagram of a computer system.

FIG. 12 is a block diagram of an exemplary computer system that may perform one or more of the operations described herein. Referring to FIG. 12, computer system 1200 may comprise an exemplary client 1250 or server 1200 computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for printing instructions, data, or other information on a medium such as paper, film, or similar types of media. Furthermore, a sound recording and playback device, such as a speaker and/or microphone may optionally be coupled to bus 1211 for audio interfacing with computer system 1200. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
generating a granular multi-scale entropy distribution for an image using information obtained from a header of a compressed bitstream, the multi-scale entropy distribution providing a measure of visual importance of different features of the image at different scales based on an estimate of a bit allocation of the image in a multi-scale domain;
applying one or more image processing operations to obtain an image representation with a maximum entropy that satisfies display constraints of a device, the image representation being obtained based on multi-scale properties of the image characterized by the estimate of the bit allocation provided by the granular multi-scale entropy distribution.

2. The method defined in claim 1 further comprising decoding only a portion of coded data in the compressed bitstream as part of applying the one or more image processing operations.

3. The method of claim 1, wherein the granular multi-scale entropy distribution is generated for blocks of the image, further comprising:
for each block and for each first scale of a set of scales:
setting a cumulative entropy distribution for the block at the first scale equal to a summation of a number of bits spent to code the block for scales at and between the first scale and a maximum scale, and setting an indicator function of the block at a chosen scale and chosen width and height offsets to one upon determining that a width of the block is not greater than a first minimum value and a height of the block is not greater than a second minimum value and to zero otherwise, wherein the first minimum value is a minimum value of a set consisting of the chosen width offset and a sum of the chosen width offset with a display width scaled by the first scale, and wherein the second minimum value is a minimum value of a set consisting of the chosen height offset and a sum of the chosen height offset with a display height scaled by the first scale;

computing a final location and a final scale, given the display constraints of the device, which together maximize a summation consisting of cumulative entropy distribution for the block at the final scale multiplied with an indicator function of the block and by a parameter; and cropping the image at the final location and down-sampling the resulting cropped image to the final scale.

4. A non-transitory computer-readable storage medium with executable instructions stored thereon which, when executed by a system, cause the system to:

generate a granular multi-scale entropy distribution using information obtained from a header of a compressed bitstream, the multi-scale entropy distribution providing a measure of visual importance of different features of the image at different scales based on an estimate of a bit allocation of the image in a multi-scale domain; and apply one or more image processing operations to obtain an image representation with a maximum entropy that satisfies display constraints of a device, the image representation being obtained based on multi-scale properties of the image characterized by the estimate of the bit allocation provided by the granular multi-scale entropy distribution.

5. The non-transitory computer-readable storage medium defined in claim 4 further comprising instructions which, when executed, cause the system to decode only a portion of coded data in the compressed bitstream as part of applying the one or more image processing operations.

6. An apparatus comprising:

means for generating a granular multi-scale entropy distribution using information obtained from a header of a compressed bitstream, the multi-scale entropy distribution providing a measure of visual importance of different features of the image at different scales based on an estimate of a bit allocation of the image in a multi-scale domain; and means for applying one or more image processing operations selected to obtain an image representation with a maximum entropy that satisfies display constraints of a device, the image representation being obtained based on multi-scale properties of the image characterized by the estimate of the bit allocation provided by the granular multi-scale entropy distribution.

7. The apparatus defined in claim 6 further comprising decoding only a portion of coded data in the compressed bitstream as part of applying the one or more image processing operations.

8. A method comprising:

receiving header information corresponding to a bit stream of multi-scale transform-based compressed data representing image data;

generating a feature vector corresponding to image description bits in the bit stream from the header information, the feature vector to provide a measure of visual importance of different features of the image at different scales based on an estimate of a bit allocation of the image in a multi-scale domain; and performing one or more operations on at least a portion of the bit stream of the image to obtain an image representation with a maximum entropy that satisfies display constraints of a device, the image representation being obtained based on multi-scale properties of the image characterized by the estimate of the bit allocation provided by the feature vector.

9. The method defined in claim 8 further comprising generating a distribution of the number of zero bit planes in one or more portions of compressed data, the distribution derived from the heading information.

10. The method defined in claim 8 further comprising generating an entropy distribution based on the header information.

11. The method defined in claim 10 wherein the entropy distribution is granular.

12. The method defined in claim 10 wherein the entropy distribution comprises a map of bit distribution for the image data.

13. The method defined in claim 10 wherein the entropy distribution is a length of coded data for codeblocks.

14. The method defined in claim 8 wherein the header information is part of a JPEG 2000 file.

15. A non-transitory computer-readable storage medium with executable instructions stored thereon which, when executed by a system, cause the system to:

receive header information corresponding to a bit stream of multi-scale transform-based compressed data representing image data;

generate a feature vector corresponding to image description bits in the bit stream the header information, the feature vector to provide a measure of visual importance of different features of the image at different scales based on an estimate of a bit allocation of the image in a multi-scale domain; and perform one or more operations on at least a portion of the bit stream of the image to obtain an image representation with a maximum entropy that satisfies display constraints of a device, the image representation being obtained based on multi-scale properties of the image characterized by the estimate of the bit allocation provided by the feature vector.

16. An apparatus comprising:

means for receiving header information corresponding to a bit stream of multi-scale transform-based compressed data representing image data;

means for generating a feature vector corresponding to image description bits in the bit stream from the header information, the feature vector to provide a measure of visual importance of different features of the image at different scales based on an estimate of a bit allocation of the image in a multi-scale domain; and means for performing one or more operations on at least a portion of the bit stream to obtain an image representation with a maximum entropy that satisfies display constraints of a device, the image representation being obtained based on multi-scale properties of the image characterized by the estimate of the bit allocation provided by the feature vector.

17. The apparatus of claim 16 further comprising means for generating a distribution of the number of zero bit planes in one or more portions of compressed data, the wherein distribution is derived from the header information.

18. The apparatus of claim 16 further comprising means for generating an entropy distribution based on the header information.

19. The apparatus of claim 18 wherein the entropy distribution is granular.

20. The apparatus of claim 18 wherein the entropy distribution comprises a map of bit distribution for the image data.

21. The apparatus of claim 18 wherein the entropy distribution is a length of coded data for codeblocks.

22. The apparatus of claim 18 wherein the header information is part of a JPEG 2000 file.

* * * * *